A. P. WEBBER.
Improvement in Plows.

No. 130,832. Patented Aug. 27, 1872.

Witnesses
Henry M. Hills
Samuel Mb. Morse

Alanson P. Webber
by Edmund Thurlow
his Atty.

AM. PHOTO-LITHOGRAPHIC CO. N.Y. (OSBORNE'S PROCESS.)

UNITED STATES PATENT OFFICE.

ALANSON P. WEBBER, OF SARATOGA TOWNSHIP, MARSHALL COUNTY, ILL.

IMPROVEMENT IN PLOWS.

Specification forming part of Letters Patent No. 130,832, dated August 27, 1872.

*To all whom it may concern:*

Be it known that I, ALANSON P. WEBBER, of Saratoga township, in the county of Marshall, in the State of Illinois, have invented an Improvement on my Plow-Fender, (patented to me by the United States on 19th December, 1871;) and do hereby declare that the following is a full, clear, and exact description thereof, reference being had to the annexed drawing making part of this specification, in which like letters of reference refer to like parts, and in which—

Figure 1:
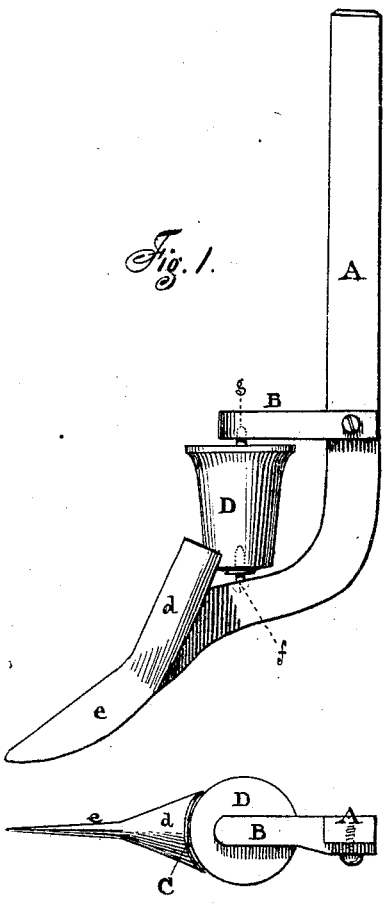
Figure 2:
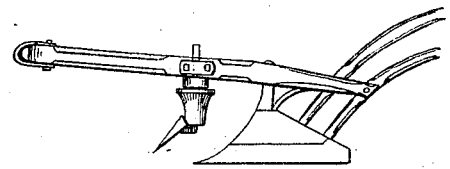
Figures 3, 4:
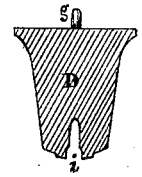

Figure 1 represents a side elevation; Fig. 2, a side elevation of my plow-fender patented 19th December, 1871, showing the application of the fender to the plow-beam; Fig. 3, a plan of Fig. 1; Fig. 4, a vertical section through the center of the rotary fender.

This is an improvement on my patent dated December 19, 1871; and the first part of my improvement thereon consists in pivoting the rotary fender in front of the dependent standard or shank by which the former is attached to the plow-beam in front of the plow or colter, instead of inserting said shank through the axis of the said rotary fender; secondly, in an extension of the small shovel which guards the front lower edge of the rotary fender into an inclined knife, for the purpose of severing roots, &c.

A represents the standard or shank which carries the "fender" *e d* D, said shank being attached in any secure way to the plow-beam by its upper part, immediately in front of the mold-board or colter, in such a position that the conical revolving fender D is held in a vertical position in front of said shank A. The lower end of the latter is bent forward horizontally, to form a rest or bearing to support the fender D, the latter being pivoted upon a pin, *f*, which projects vertically upward from said bend. This bend or elbow terminates in a shovel, *d*, described in my former patent of December 19, 1871, which defends from weeds or rubbish the lower end of the "fender" D, half encircling the same at that part, and inclined hence downward, at a considerable angle—about forty-five degrees—with the horizon, with a convex surface, and ending in a knife or small colter, *e*, the edge of which is directed upward and forward, but at rather a less inclination to the horizon than that of the shovel *d*. B is a horizontal arm projecting from the shank A to receive the upper end of the axle or pin on which the fender D revolves, which arm may be screwed or otherwise fastened to the shank A; or it may be cast or forged with and form part of the same. D is the revolving fender, in shape a conoid inverted, and having a circular "abacus" or projecting rim at its upper end, (similar in shape to the one described in my before-mentioned patent.) A projecting pin, *g*, at its upper extremity, enters and turns in a recess in the horizontal supporting-arm B, and a recess, *i*, in the lower end of the fender D, receives the pin *f*, which projects from the surface of the lower arm or bend of the shank A.

The operation of this improvement is as follows: Unlike the rotary fender of the former patent—which was set on the lower end of the standard or shank, the great diameter of which operated to retard or stop the free motion of the fender—this fender D, being pivoted on small bearings *f g*, is allowed the utmost liberty of motion on being touched by weeds or similar rubbish, which would otherwise hamper the fender, were it not instantaneously thrown off. Further, the inverted socket or bearing of the lower end of the fender D precludes the admission of dirt to clog its motion; and the shovel *d*, which protects the front of said fender from being clogged with weeds, &c., but throws the latter against the body of the same, is assisted in its operation by the addition of a terminal knife, *e*, which cuts off such roots as might interfere with the plow or prevent this shovel *d* and the plow from advancing with a regular motion.

What I claim as my invention is—

The rotary fender B, having pivotal pin *g* and socket *i*, in combination with stop *f*, projecting arm B, and shovel *d*, substantially as set forth.

In testimony that I claim the foregoing improvement on plow-fender I have hereunto set my hand and seal this 3d day of April, 1872.

ALANSON P. WEBBER.

Witnesses:
  HENRY W. WELLS,
  JAMES M. MORSE.